(12) United States Patent
Wiese

(10) Patent No.: US 6,275,025 B1
(45) Date of Patent: Aug. 14, 2001

(54) MAGNETIC POSITION SENSOR

(75) Inventor: Peter Wiese, Königstein (DE)

(73) Assignee: Mannesmann VDO AG, Frankfort/Main (DE)

(*) Notice: Subject to any disclaimer, the term of this patent is extended or adjusted under 35 U.S.C. 154(b) by 0 days.

(21) Appl. No.: 09/230,055

(22) PCT Filed: Aug. 9, 1997

(86) PCT No.: PCT/EP97/04347
§ 371 Date: Jan. 14, 1999
§ 102(e) Date: Jan. 14, 1999

(87) PCT Pub. No.: WO98/08061
PCT Pub. Date: Feb. 26, 1998

(30) Foreign Application Priority Data

Aug. 23, 1996 (DE) ............................... 196 34 074
Jul. 23, 1997 (DE) ............................... 197 31 555

(51) Int. Cl.$^7$ ............................... G01B 7/30; G01D 5/14
(52) U.S. Cl. ............................... 324/207.2; 324/207.22; 324/207.25
(58) Field of Search ............................... 324/207.2, 207.21, 324/207.22, 207.25, 174; 338/32 R, 324; 310/68 B, 154

(56) References Cited

U.S. PATENT DOCUMENTS 4,204,158 * 5/1980 Ricouard et al. ................ 324/207.2

FOREIGN PATENT DOCUMENTS

| 4307544 | 9/1994 | (DE) . |
| 0578299 | 1/1994 | (EP) . |
| 0611911 | 8/1994 | (EP) . |
| 2388248 | 11/1978 | (FR) . |
| WO9210722 | 6/1992 | (WO) . |

* cited by examiner

*Primary Examiner*—Walter E. Snow
(74) *Attorney, Agent, or Firm*—Mayer, Brown & Platt

(57) ABSTRACT

The invention relates to a magnetic position sensor in which at least two stator elements are arranged in a magnetic field, a magnetic field probe being located in the air gap between the stator elements, a means that follows the movement of an object being arranged parallel to the plane spanned by the stator elements.

Figure 1:
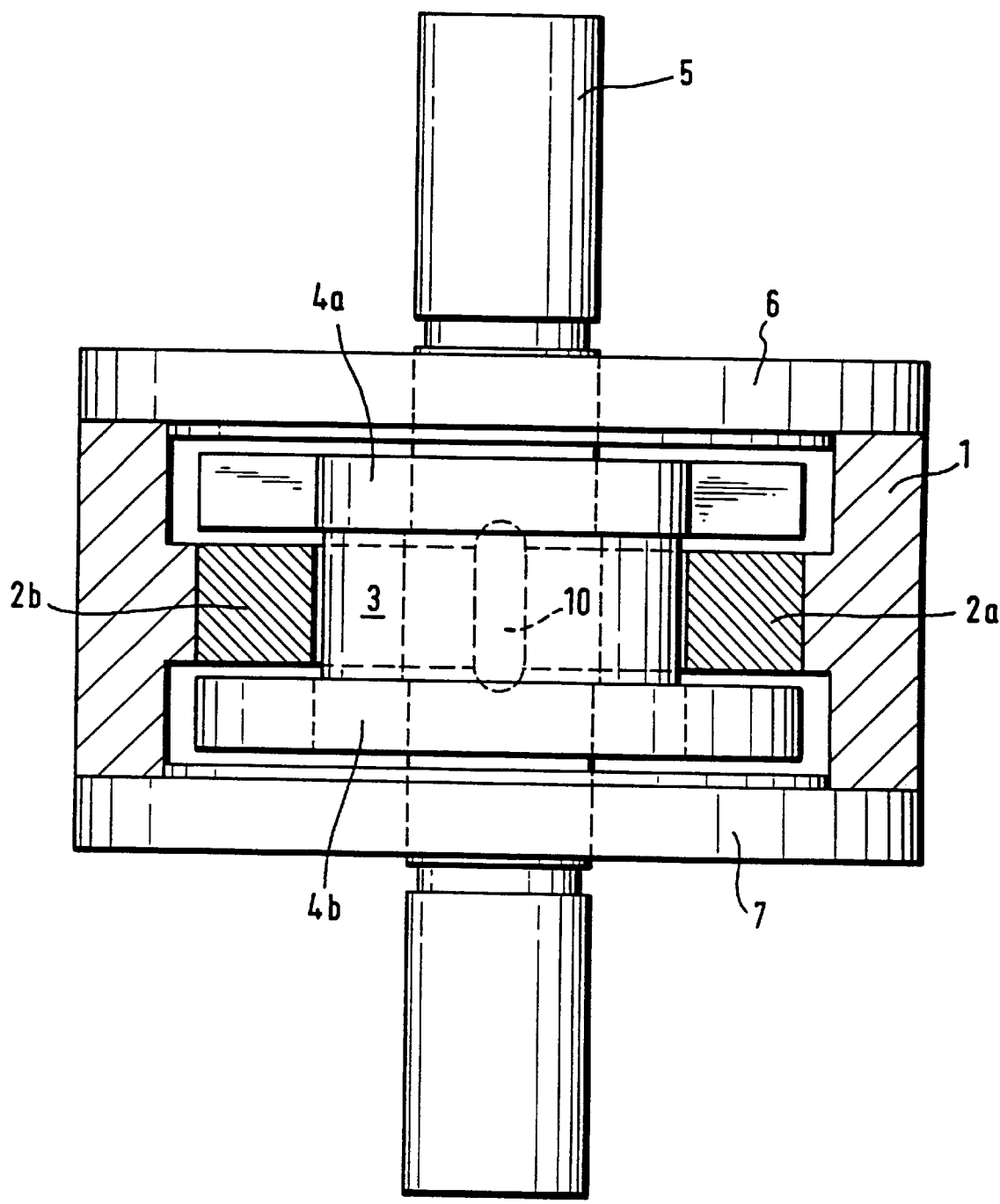

In the case of a position sensor which is independent of axial play, the means connected to the movable object is of two-part design, each soft-magnetic part (4a, 4b) having at least one segment and the soft-magnetic elements being connected to one another rigidly in a manner displaced relative to one another, with the result that the segment of the first element (4a) is located opposite a segment gap in the second element (4b), the stator elements (2a, 2b) being arranged between the soft-magnetic elements (4a, 4b) and a magnet (3) that generates the magnetic field perpendicular to the plane spanned by the stator elements (2a, 2b) being arranged both between the stator elements (2a, 2b) and the soft-magnetic elements (4a, 4b).

18 Claims, 10 Drawing Sheets

MAGNETIC POSITION SENSOR

This application is made pursuant to 35 U.S.C. § 371 of international application number PCT/EP97/04347, filed Aug. 9, 1997, with a priority date of Aug. 23, 1996.

A FIELD OF THE INVENTION

The invention relates to a magnetic position sensor in which at least two stator elements are arranged in a magnetic field and a magnetic field probe is located in the air gap between the stator elements, a means further including that follows the movement of an object being arranged parallel to the plane spanned by the stator elements.

BACKGROUND OF THE INVENTION

WO 92/10722 discloses a Hall-effect angle sensor which is able to output angle-proportional signals. The angle is acquired by means of a Hall probe which is located in an air gap formed between two semicylindrical or shell-shaped stator halves.

A rotor comprises two disk-type magnets which are magnetized in an alternating direction and are mounted over a return path disk. The rotor is located before the two stator halves in the axial direction. In this case, the magnetization direction of the magnets is perpendicular to the axis of rotation.

The magnetic flux which issues from the north pole of the disk-type magnet is distributed depending on the angular position of the stator halves with respect to the magnet halves before it enters the south pole of the magnet.

If the north/south axis of the magnet is parallel to the air gap, then approximately half of the magnetic flux will flow through each of the two stator halves. Virtually no flux passes through the air gap in this case. The measurement induction tends to zero.

If the north/south axis of the magnet is perpendicular to the air gap, then virtually the entire magnetic flux first of all enters one stator half, crosses the air gap, enters the second stator half and from there the south pole of the magnet. Consequently, the Hall probe records a measurement induction maximum.

Since the magnetic flux takes a path along which, in addition to the measurement air gap, it must also twice traverse the air gap between magnet and stator halves in the axial direction, fluctuations in this air gap, for example in the form of mechanical axial play, produce a great change in the measured value.

Consequently, the invention is based on the object of specifying a magnetic position sensor which is insensitive to displacements in the movable means in a direction other than the measurement direction.

SUMMARY OF THE INVENTION

According to the invention, the object is achieved by the fact that the means connected to the movable object is of two-part design, each soft-magnetic part having at least one segment and the soft-magnetic elements being connected to one another rigidly in a manner displaced relative to one another, with the result that the segment of the first element is located opposite a segment gap in the second element, the stator elements being arranged between the soft-magnetic elements and a magnet that generates the magnetic field perpendicular to the plane spanned by the stator elements being arranged between the soft-magnetic elements.

This asymmetrical structure of the means connected to the movable object results in generation of a magnetic compensating flux via the measurement air gap.

In a refinement, the means connected to the movable object is a rotor which is arranged in the axial direction with respect to the stator elements.

The rotor is of two-part design, each soft-magnetic rotor element having at least one circle segment, and the rotor elements being connected to one another rigidly in a manner rotated relative to one another, with the result that the circle segment of the first rotor element is located opposite a segment gap in the second rotor element, the rotor elements being arranged between the stator elements and a magnet that generates the magnetic field in the axial direction being arranged both between the rotor elements and the stator elements.

The advantage of the invention is that the rigid two-part rotor configuration prevents the effects of axial play on the sensor signal, since the two air gaps occurring between rotor and stator are simultaneously changed in opposite directions and, consequently, the sum of the air gaps is always constant.

In an advantageous manner, the sum of the two air gaps which are formed in the axial direction between the rotor elements and a respective stator element is small compared with the axial extent of the magnet, as a result of which the magnetic flux through the stator is supported.

In a refinement, the stator elements are likewise of circle segment-like design.

The outer radius of the circle segment of at least one rotor element approximately corresponds to the outer radius of the circle segment-like stator element. The rotor elements are characterized by two radii, the first radius approximately corresponding to the outer radius of a stator element and the second radius approximately corresponding to the radius of the magnet.

In this case, the magnetic field probe is arranged radially with respect to the rotary spindle of the sensor in the air gap between two stator elements.

In a development, the outer radius of the circle segment of at least one rotor element is less than the outer radius of a stator element. This enables the arrangement of the magnetic field probe axially with respect to the axis of rotation of the shaft of the sensor in the air gap between the two stator elements. The advantage of this arrangement is that the magnet can now be dimensioned optimally since the axial spacing between the two rotor parts can be varied freely.

A simplification in the assembly of the overall sensor is achieved if the circle segment of the first rotor element has a smaller angle than the segment gap between two stator segments.

The asymmetrical configuration of the rotor disk results in the magnetic flux being guided in a targeted manner via the two stator halves.

Since the angular dependence of the flux guidance is achieved not by way of the contour or magnetization of the magnet but by the asymmetrical configuration of the rotor, the requirements on the magnet are minimal.

The magnet merely has to generate an axially directed field. This field can optionally be generated by a rotatably mounted permanent magnet or a magnet which is positionally fixed with reference to the stator and, in this case, can be designed either as a permanent magnet or as an electromagnet.

In a development, the magnet is designed as a permanently magnetic ring magnet.

The ring magnet can be mounted in a particularly simple manner in the sensor if it is directly connected to the two stator halves in a positionally fixed manner.

In another refinement, the magnet is fastened on a continuous rotor shaft by being fitted onto said shaft.

In a further design, the two rotor disks are rigidly coupled by means of a nonmagnetic sleeve, a respective rotor disk being fixedly arranged on a part of a rotor shaft, which is divided into two.

In this case, the stator elements are arranged coaxially around the axis of rotation of the rotor shaft.

These and other features and advantages of the invention will be apparent upon consideration of the following detailed description of the preferred embodiment of the invention, taken in conjunction with the appended drawings.

Figure 2:
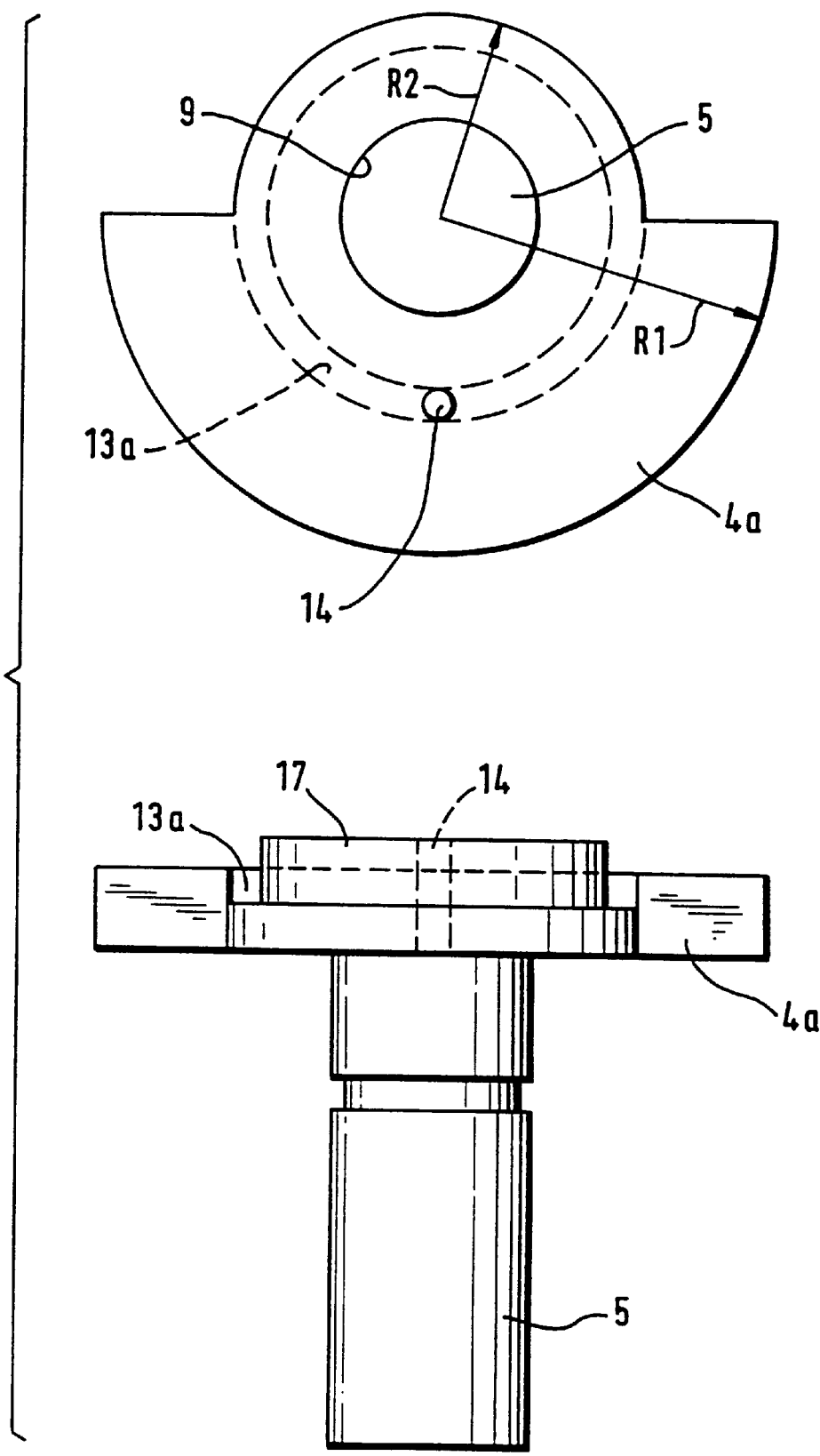
Figure 3:
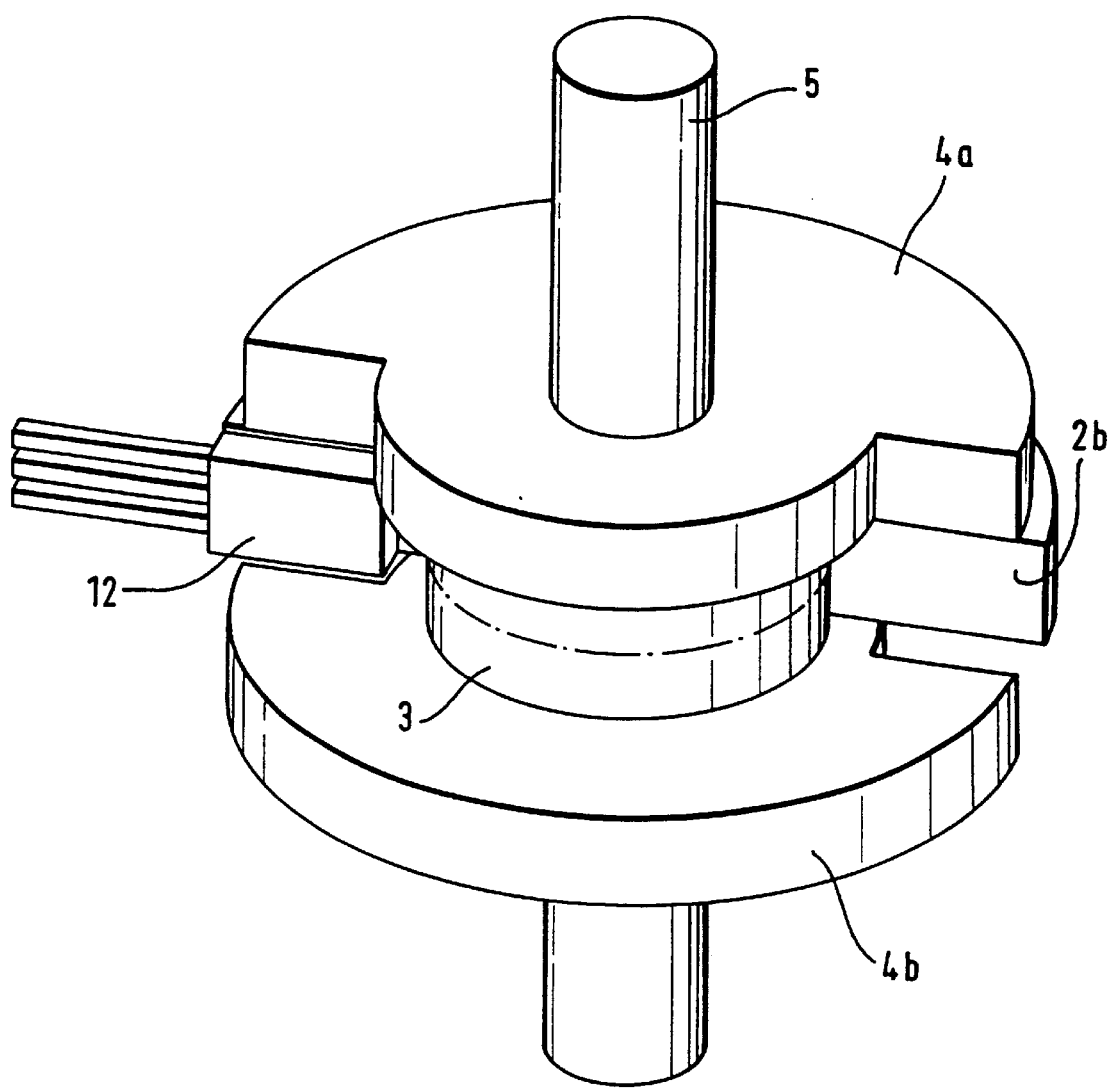
Figure 4:
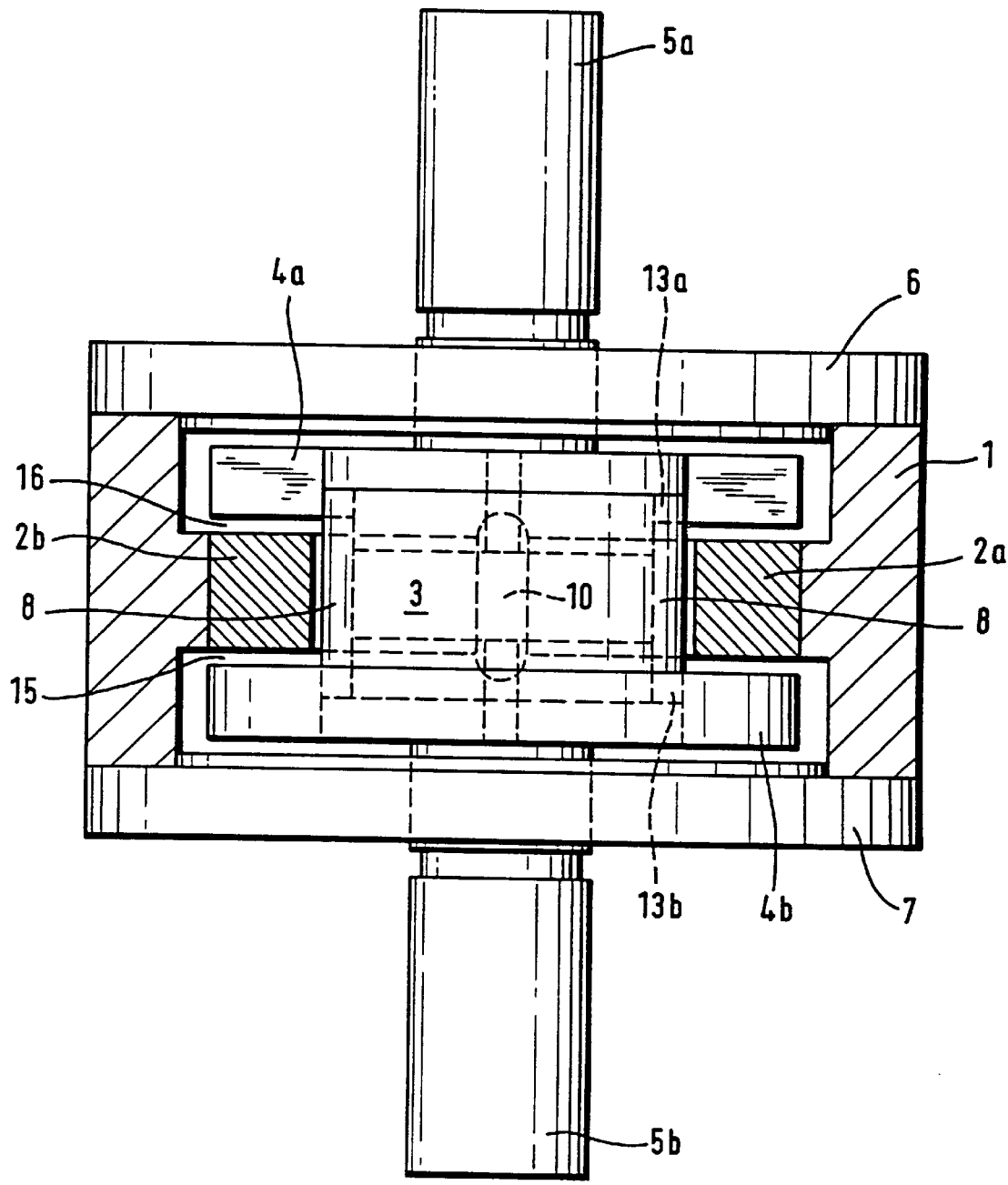
Figure 5:
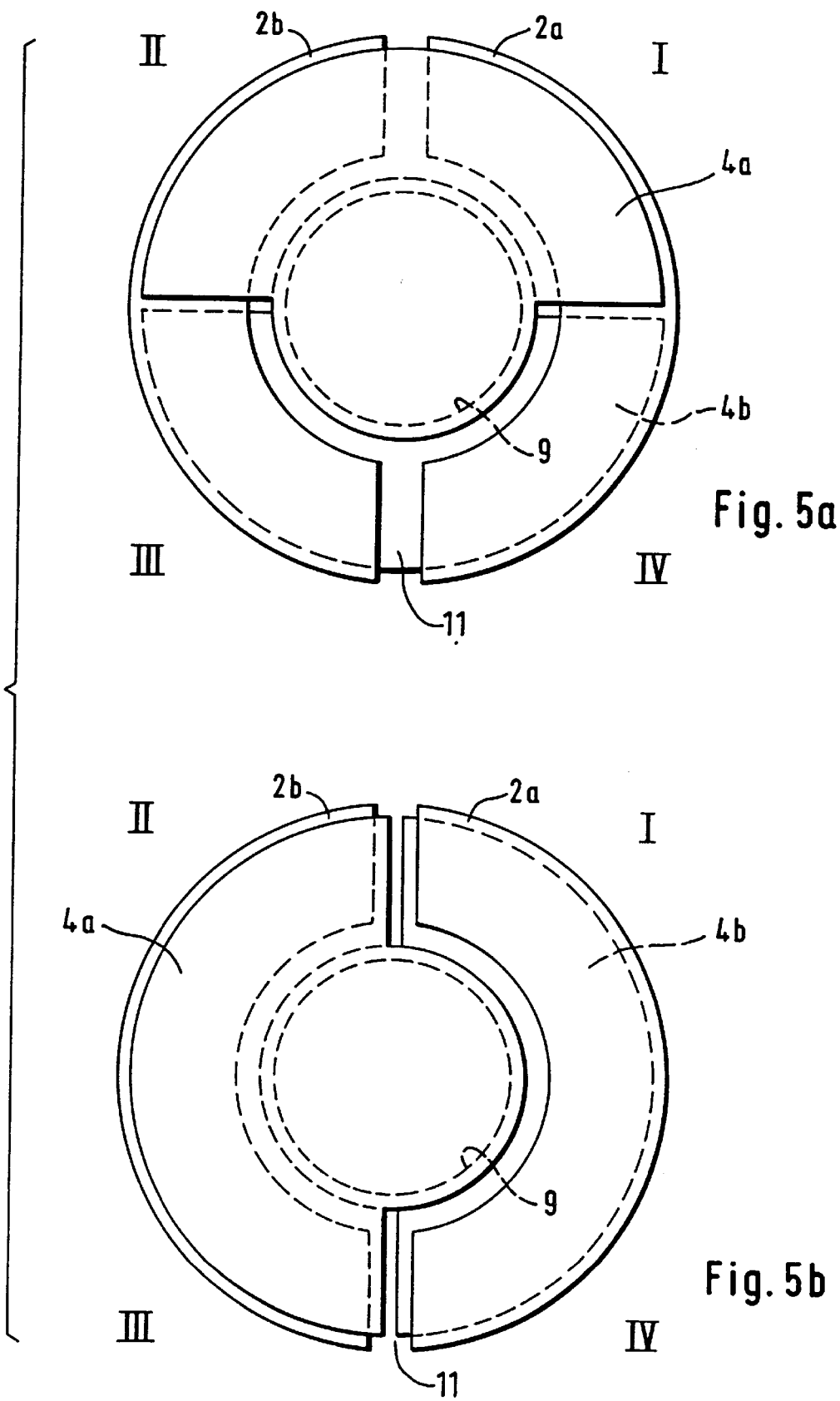
Figure 6:
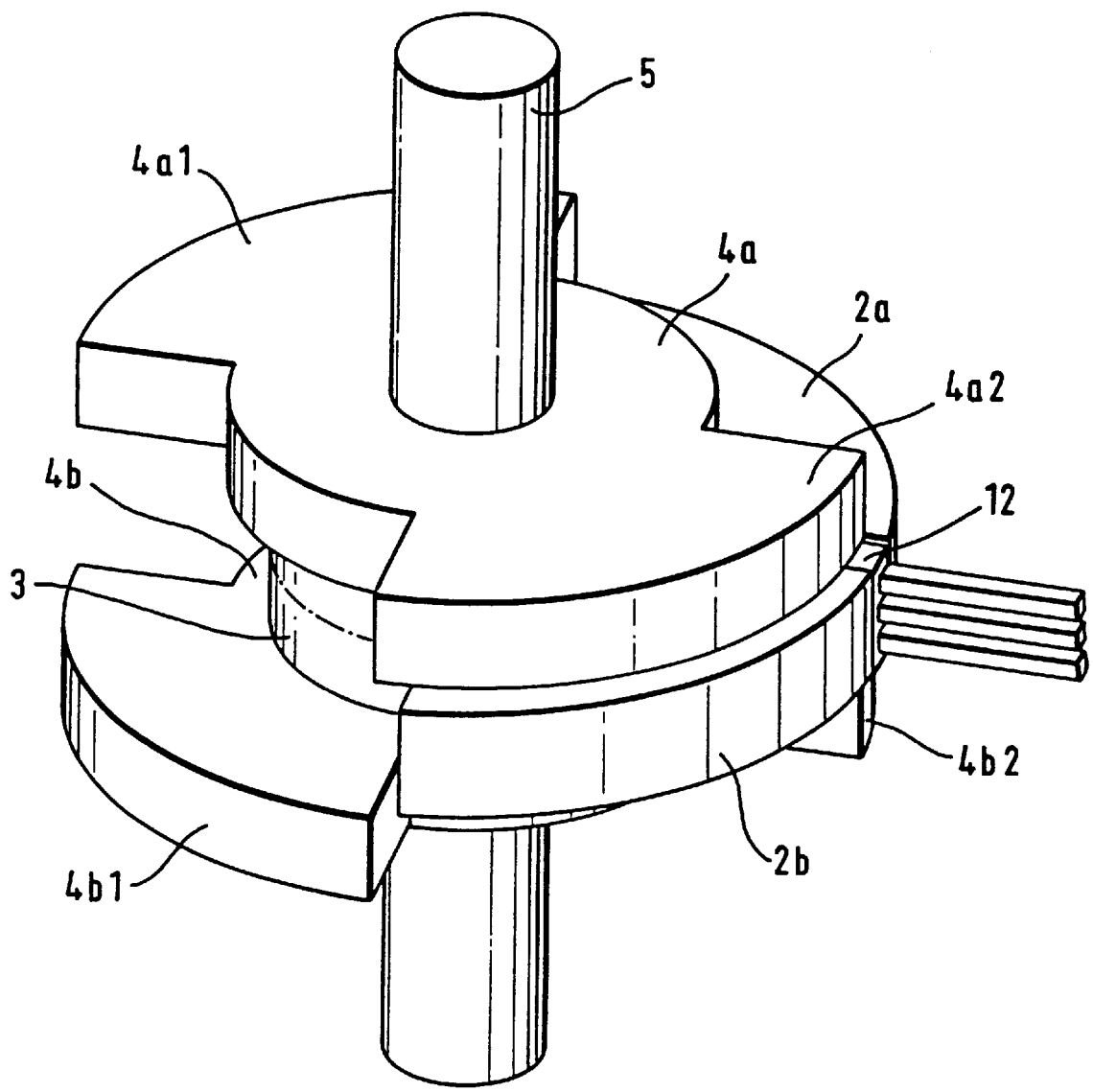
Figure 7:
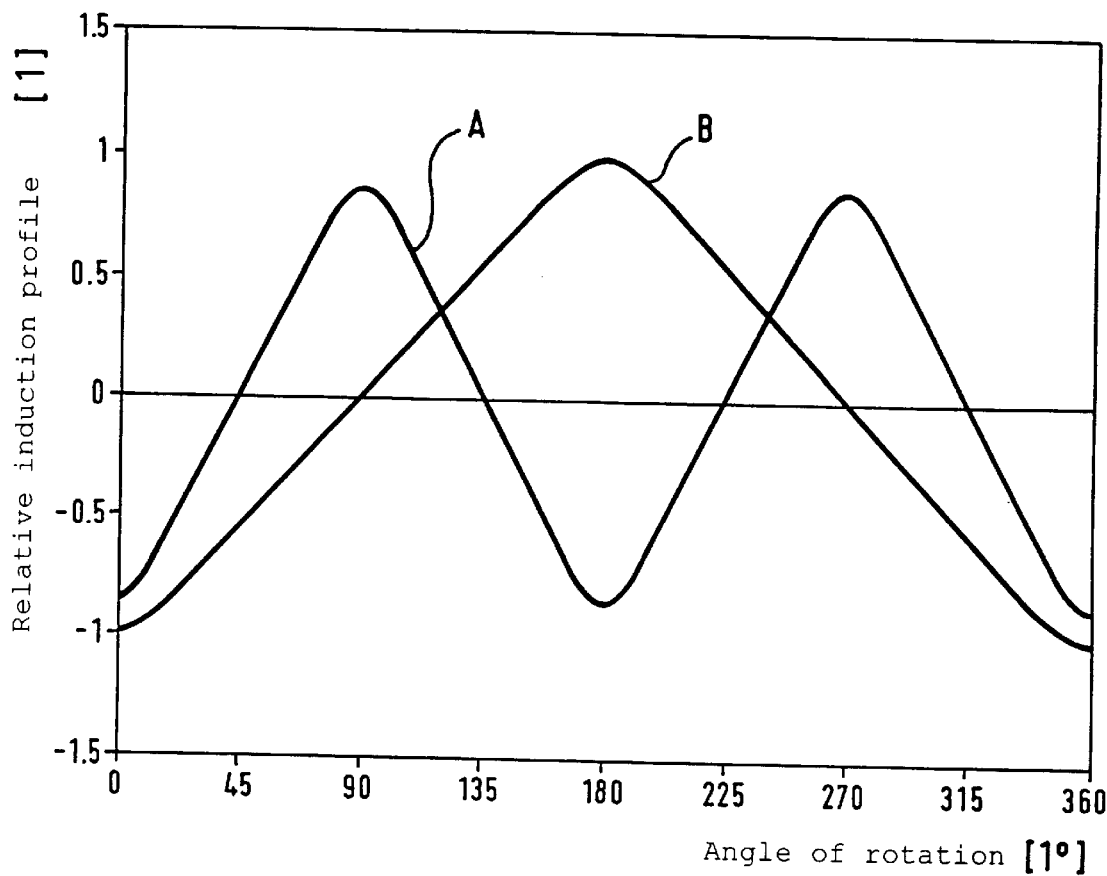
Figure 8:
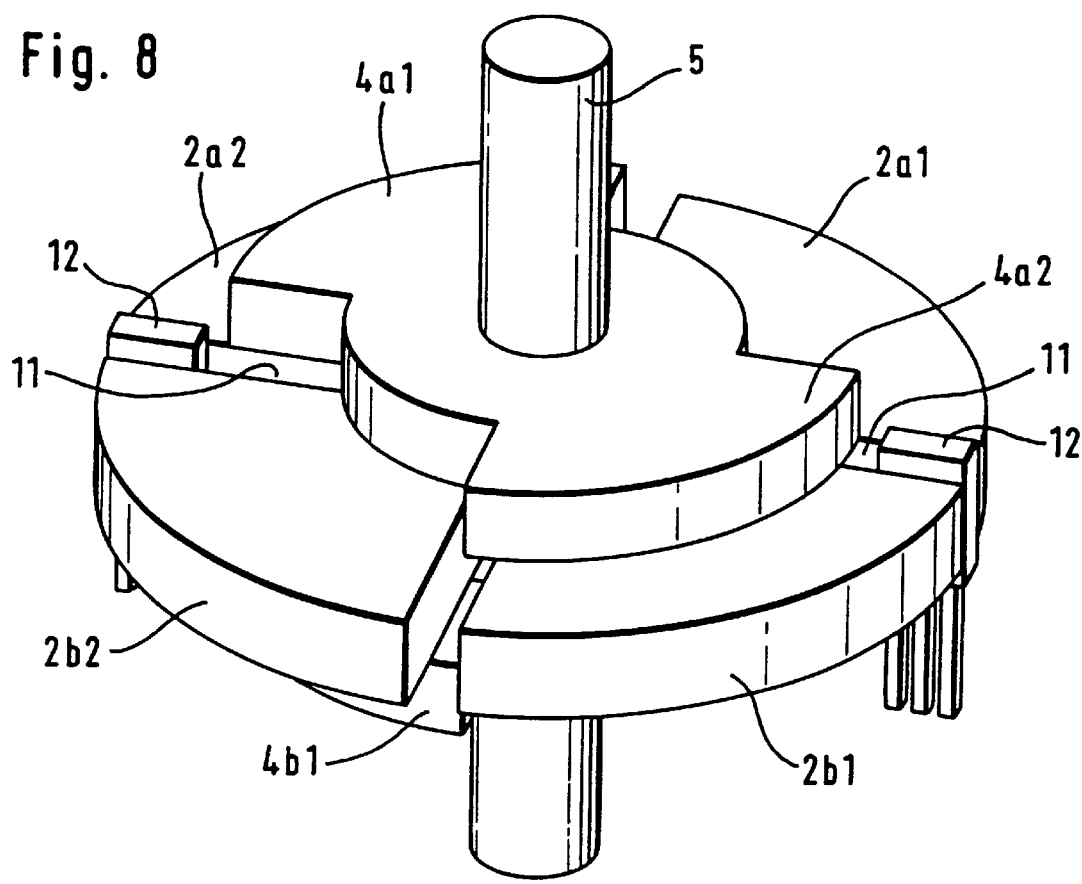
Figure 9:
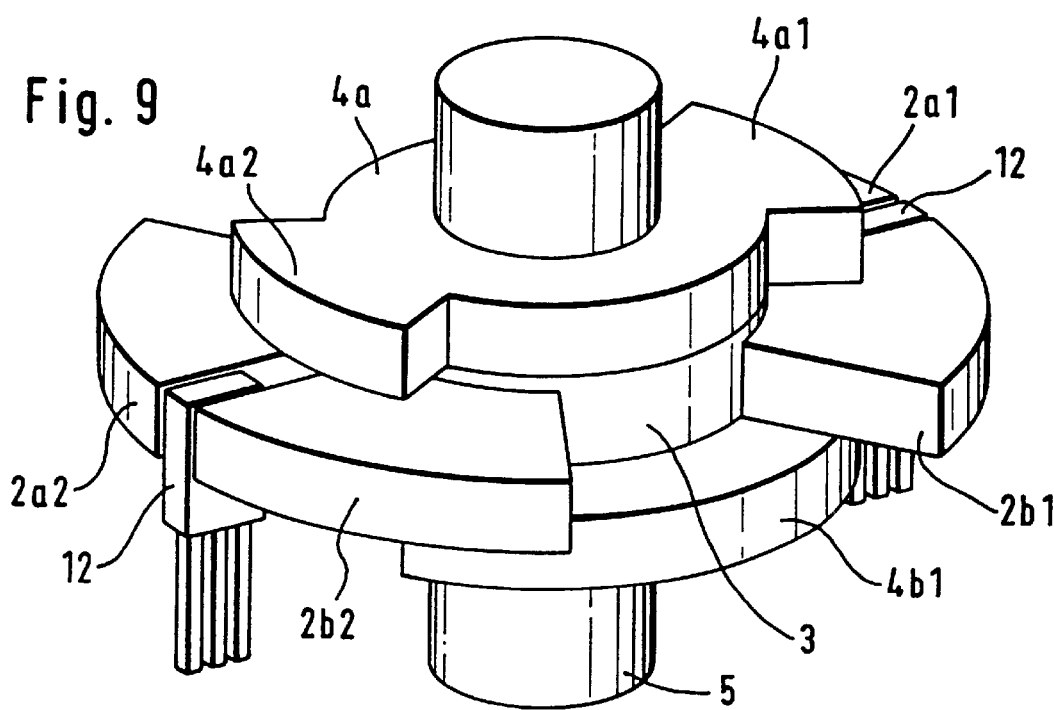
Figure 10:
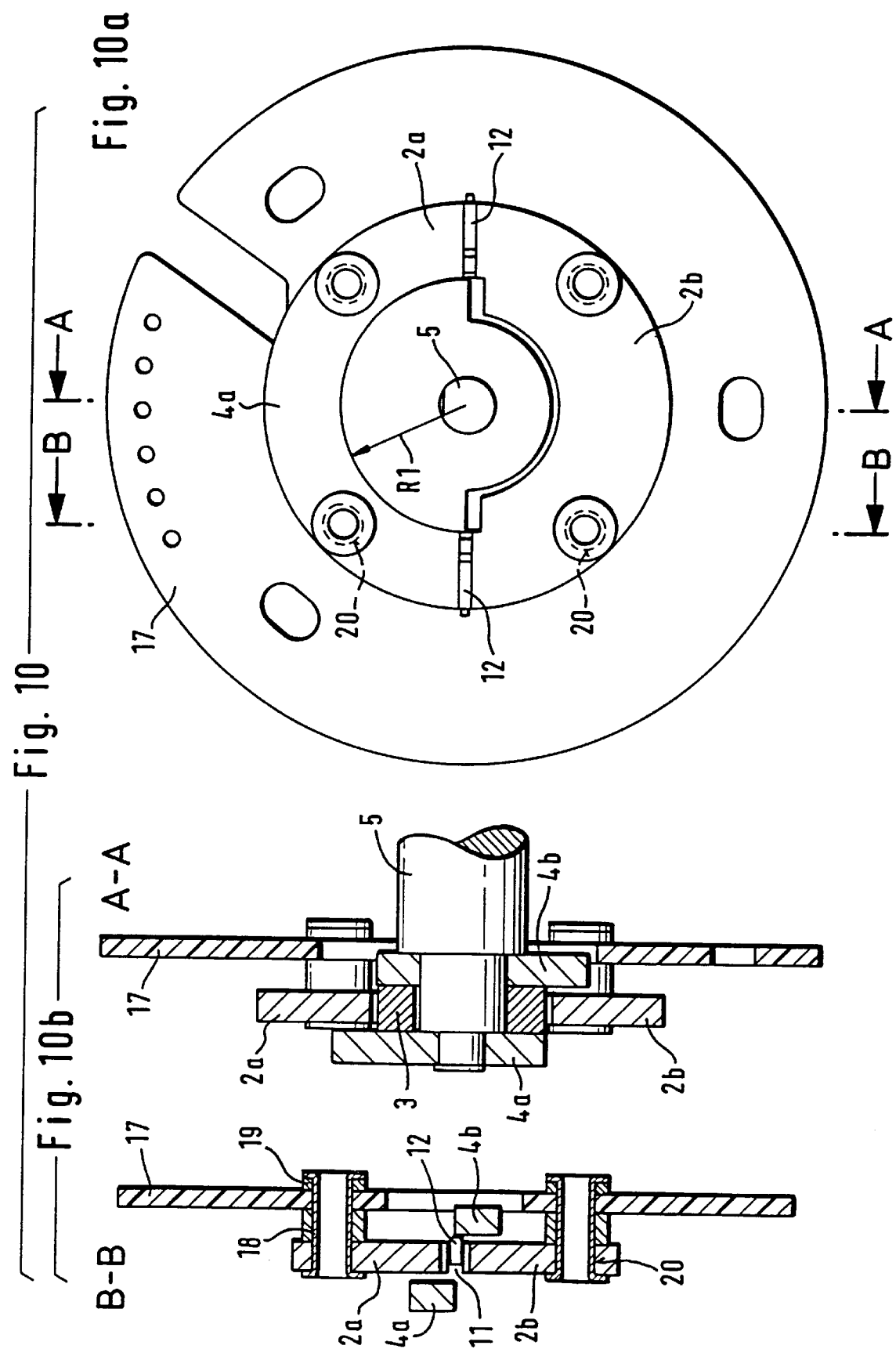
Figure 11:
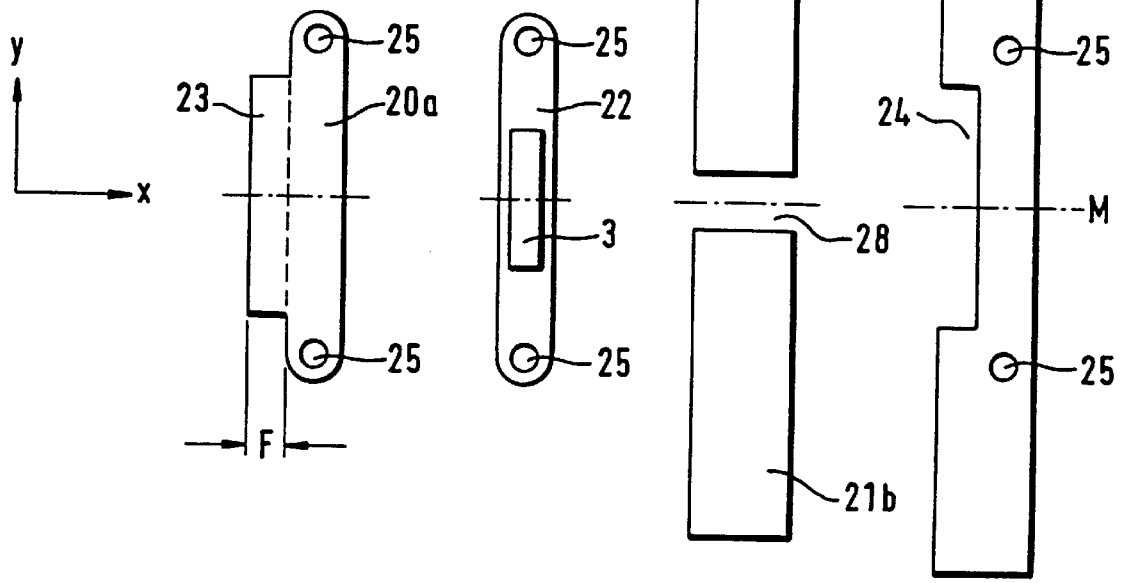
Figure 12:
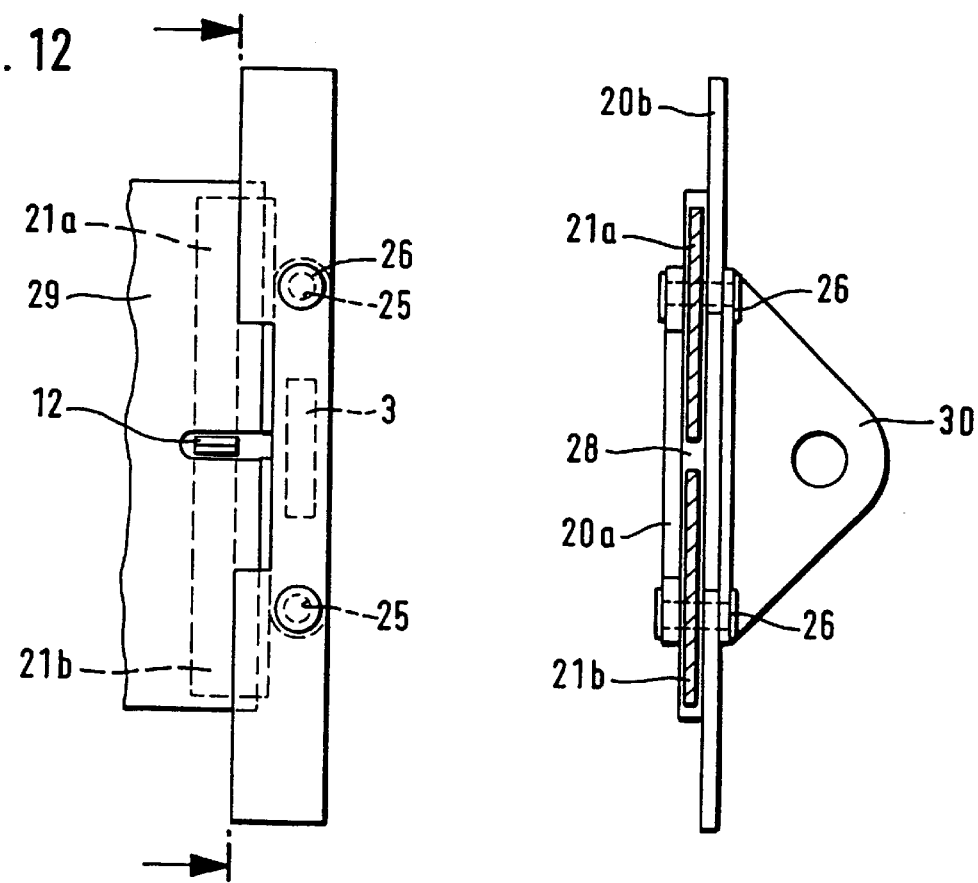

In the figures:

FIG. 1 shows a first design of the angle sensor according to the invention with a section through housing and stator FIG. 2 shows a first design of the rotor FIG. 3 shows a rotor-stator arrangement FIG. 4 shows a second design of the angle sensor according to the invention FIGS. 5a and 5b show a rotor-stator arrangement perpendicular to the axis of rotation FIG. 6 shows a second design of the rotor-stator arrangement FIG. 7 shows signal profile against the angle of rotation FIG. 8 shows a third design of the rotor-stator arrangement FIG. 9 shows a fourth design of the rotor-stator arrangement FIGS. 10a and 10b show an arrangement of the angle sensor on a carrier element FIG. 11 shows the fundamental structure of a linear magnetic position sensor FIG. 12 shows a section through a linear magnetic position sensor.

DETAILED DESCRIPTION ON THE PREFERRED EMBODIMENT

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

Identical parts are identified by identical reference symbols.

The fundamental principle will firstly be explained using a rotor configuration having two semicircular rotor segments. This arrangement is favorable for applications where angles of rotation of 90° are intended to be acquired, such as, for example, in a throttle valve in internal combustion engines.

FIG. 1 illustrates an angle sensor in which a soft iron ring divided into two is arranged as stator having the stator parts 2a, 2b in a manner connected by a material joint in a nonmagnetic brass housing 1. The preferably shell-shaped stator parts 2a, 2b, which constitute a hollow-cylindrical stator when regarded together, are arranged coaxially around a permanent magnet 3. In this case, the magnet 3 is magnetized axially.

The magnet 3 is located between two rotor disks 4a, 4b made of soft-magnetic material which are rotated through 180° relative to one another.

Each rotor half 4a, 4b is in this case characterized by a first outer radius over 180° of the disk and by a second outer radius over the remaining 180° of the disk. The larger outer radius R1 approximately corresponds to the outer radius of the stator 2, and the smaller radius R2 is coordinated with the magnet diameter (FIG. 2). In this case, R1>R2, with the result that each rotor segment essentially appears semicircular.

The rotor halves 4a, 4b each have a central hole 9, which receive the continuous rotor shaft 5. The rotor halves 4a, 4b are in this case fixedly locked in place on the continuous rotor shaft 5. The rotor shaft 5 is composed of nonmagnetic material.

The rotor halves 4a, 4b may alternatively be designed as part of the rotor shaft 5.

In this case, the rotor shaft 5 is composed of the same magnetic material as the rotor segments 4a, 4b. The mechanical coupling of the shaft to be monitored is in this case effected nonmagnetically.

In an advantageous manner, the magnet 3 is likewise designed hollow-cylindrically as a ring magnet and fastened on the rotor shaft 5.

The likewise hollow-cylindrical housing 1 is closed off at both ends by coverings 6 and 7 in which the rotor shaft is mounted.

A magnetic field probe 12, for example a Hall probe or other magnetic field probes (inductive systems), is introduced through the openings 10 in the housing 1 into the air gap 11, situated behind them, between the two stator halves 2a, 2b.

This is illustrated once again in principle in FIG. 3. In order to render the Hall-effect sensor 12 visible, the second stator half 2a is not illustrated. This would be located in front of the Hall-effect sensor 12.

According to FIG. 4, the magnet 3 is of cylindrical or paralellapipedal design and accommodated in a nonmagnetic sleeve 8. The magnet 3 can be bonded into the sleeve 8.

In the present case, the rotor shaft 5 is of two-part design. A rotor disk 4a, 4b is fastened on each part of the rotor shaft 5a, 5b. The sleeve 8 engages in a milled-out portion 13a, 13b of the rotor disk 4a, 4b and thus connects the two parts of the rotor shaft 5a, 5b rigidly to one another.

The sleeve 8 is additionally secured by a locking pin 14.

For the purpose of height equalization between magnet 3 and Hall probe 12, a raised soft-magnetic region 17 is located on the rotor disks 4a, 4b (FIG. 2).

The stator 2a, 2b is located between the two rotor halves. The two stator halves 2a, 2b have good permeability. Furthermore, the sum of the two air gaps 15, 16 which are formed in the axial direction between rotor and stator is small compared with the length of the magnet 3. The effect achieved by this is that the larger proportion of the magnetic flux flows via the two stator halves.

In a specific embodiment, samarium cobalt is used as the magnetic material. Given an axial extent of the magnet 3 of 3 mm, the air gaps 15, 16 between rotor disks 4a, 4b and the stator halves 2a, 2b are approximately 0.5 mm.

The method of operation of the angle sensor described will now be explained with the aid of FIG. 5. To provide a better understanding, quadrants have been placed over the sensor 4.

In principle, the magnetic flux from the north pole of the magnet enters the first stator half. A smaller part closes as leakage flux via the air space toward the south pole of the magnet, where it enters the second rotor half and then the south pole.

The rotor is initially oriented as illustrated in FIG. 5a. The section line ("chord" of the semicircular disks 4a, 4b) is perpendicular to the measurement air gap 11. In this position, in each case about half of the useful magnetic flux in the first quadrant will issue from the upper rotor half-disk 4a, flow via the right-hand stator half 2a to the fourth quadrant, where it will enter the lower rotor half-disk 4b. The other half of the flux will issue from the upper rotor half-disk 4a in the second quadrant, flow via the left-hand stator half 2b to the third quadrant, where it will enter the lower rotor half-disk 4b.

The induction in the measurement air gap 11 tends to zero. Since the flux does not cross the air gap 11, the minimal reluctance of the entire circuit and, consequently, the maximal magnetic flux are produced. The rotor 4a, 4b will therefore preferably assume this position without any external force effect.

The same conditions result when the rotor is rotated further through 180°.

In the next step, let the rotor be rotated further through 90° in the mathematically positive direction, as is illustrated in FIG. 5b. As a result, the rotor half-disk 4a connected to the north pole is located above the left-hand stator half 2b. The rotor half-disk 4b connected to the south pole is situated above the right-hand stator half 2a.

In practice, the entire flux, distributed uniformly over the 2nd and 3rd quadrants, crosses over from the left-hand half-disk 4a (north pole) into the left-hand stator half 2b, crosses the air gap 11 and then enters the right-hand rotor half-disk 4b (south pole) in the region of the 1st and 4th quadrants.

The induction in the measurement air gap 11 thus has a maximum. Since the magnetic flux crosses the air gap, the maximal reluctance of the overall circuit, and, consequently, the minimal magnetic flux are produced. An unstable zero-force position is produced. The maximal restoring moment occurs to the left and right of this position.

The same conditions are produced when the rotor is further rotated through 180°. In this case, the sum of the magnetic flux through the measurement air gap 11 is reversed.

The output signal is periodic with 360° and thus unambiguous in a range of up to 180°. Furthermore, the output signal is largely linear in the region of 120°. In applications where a redundant signal is required, it is possible to place a 2nd sensor in the air gap 11 between the stator elements 2a, 2b.

Since the outer surfaces of the stator constitute equipotential surfaces on account of the high permeability, the induction in the linear regions of the air gap 11 has the same magnitude at all points. This results in very good conformity between the two channels, with the result that, for example, the malfunction of one of the two channels can be detected very early.

In the case of the angle sensor described, the sum of the air gaps which exist axially on both sides between rotor half-disks 4a, 4b and stator halves 2a, 2b always remains constant.

This results in very good suppression of the influence of axial play on the measurement signal.

If angles of rotation of, for example, 30° or less are intended to be detected, as is necessary on an accelerator pedal of a motor vehicle, for example, it is necessary to increase the signal swing for small measurement ranges.

A rotor arrangement of the kind illustrated in FIG. 6 is chosen for this purpose. The rotor elements 4a and 4b are now designed in such a way that they comprise an integer number of segments which are in each case offset relative to one another by their own width and are magnetically coupled in the direction of the center of rotation.

These rotor elements 4a, 4b are also coupled to one another rigidly.

In the simplest case, each rotor element has two segments which are arranged opposite one another. The first rotor element 4a has segments 4a1, 4a2 which are displaced by 180° relative to one another, and the second rotor element 4b likewise has two segments 4b1, 4b2. The two rotor elements 4a, 4b are offset relative to one another in such a way that a segment gap in the rotor element 4b is located opposite the segment 4a1 of the rotor element 4a. The same applies to the segments 4b1, 4b2 of the second rotor element 4b, a segment gap in the first rotor element 4a always being located opposite them. The distance between two segments 4a, 4a2 and 4b1, 4b2 of a rotor element 4a and 4b, respectively, is in each case referred to as the segment gap here.

It is alternatively conceivable for the rotor elements 4a, 4b to have N segments. In that case, the rotor elements are arranged such that they are offset by 180°/N. relative to one another. As already explained, the width of each blade is correspondingly 180°/N. As a result, the periodicity of the signal is reduced by 1/N by comparison with the semicircular variant.

FIG. 7 illustrates the signal profile as a function of the angle of rotation. In this case, curve A shows the flux profile in the measurement air gaps for a rotor arrangement of the kind illustrated in accordance with FIG. 6. A period of 180° is achieved with two segments.

The signal profile for the semicircular rotor arrangements is represented by the line B. A period of 360° is achieved with this single-segment arrangement.

The effective areas of the rotor arrangement 4a, 4b and of the stator arrangement 2a, 2b via which the flux is coupled in are proportionally 1:2 N. The number of air gaps is 2 N.

The system illustrated in FIG. 6 has a stator arrangement comprising two 90° segments 2a, 2b which are arranged next to one another and together form a region of 180°. The stator segments 2a, 2b are arranged between the rotor elements 4a, 4b and form against one another an air gap in which the Hall probe 12 is arranged radially with respect to the shaft 5.

A redundant system is illustrated in FIG. 8. 2 stator elements 2a1, 2b1 and 2b2, 2a2 designed as 90° segments in each case form the measurement air gap 11, in each of which a magnetic probe 12 is arranged. In the case of this design, the stator segments 2a1, 2a2, 2b1, 2b2 are provided with a larger outer radius than the rotor segments 4a1, 4a2, 4b1 and 4b2. In this case, the magnetic probes 12 may be arranged rotated through 90°, that is to say axially with respect to the direction of rotation of the sensor, in the measurement air gap 11. Both magnetic field probes can be arranged on one and the same printed circuit board on account of this design.

The magnet 3 can now be optimally dimensioned since the axial spacing between the two rotor elements 4a, 4b can be freely chosen.

In the arrangements considered up to this point, the periodicity of the signal is matched to the measurement range.

An integer division of rotor and stator by N was performed for this purpose. If a departure is made from integer divisions, then the result is regions with gradient 0 or doubled gradient within a full revolution through 360°.

However, noninteger divisions of rotor and stator are also conceivable for applications with a limited angular range.

FIG. 9 illustrates an example in which 57° segmentation has been performed and a redundant signal is generated.

For this purpose, four stator elements 2a1, 2b1, 2a2, 2b2 are provided, of which in each case two stator segments 2a1, 2b1 and 2a2, 2b2 adjoin one another approximately parallel. Open regions of in this case 66°, for example, are produced between said two stator pairs 2a1, 2b1; 2a2, 2b2.

The rotor element 4a has two segments 4a1, 4a2 of single stator width (57°). The rotor element 4b has a complementary structure, that is to say the gaps have an extent corresponding to the width of the circle segments 4a1, 4a2 of the rotor element 4a.

If the rotor stack 4a, 4b is brought into a suitable position corresponding to ±90° with respect to the position illustrated, then it can be axially joined as a whole or dismantled.

This makes it possible to achieve a significant simplification of assembly since now the stator side (printed circuit board 17) with stators and electronics and equally the rotor side (rotor elements 4a, 4b, magnet 3 and shaft 5) can be handled as preassembled units.

For example, the rotor side can be premounted on a nonmagnetic body, composed of plastic, for example, which is then pressed onto the shaft 5. The plastic body makes it possible to produce magnetic decoupling of the shaft 5, which may then be composed of soft-magnetic material. In addition, the shaft then no longer needs to be shouldered, which likewise signifies a simplification.

FIG. 10 illustrates the arrangement of the sensor on the printed circuit board. In order to afford a simplified illustration, the rotor elements have in this case been chosen to have a semicircular configuration according to the exemplary embodiment in FIG. 1. FIG. 10a shows the plan view of the printed circuit board 17, while FIG. 10b shows the corresponding sectional views.

The rotor elements 4a, 4b are pressed onto a nonmagnetic, doubly shouldered shaft 5. The stator segments 2a, 2b are fastened through holes 20 by means of hollow rivets 18 and disks 19 on the printed circuit board 17, on which are also arranged the magnetic field sensors 12, which are arranged in the measurement air gap between the stator segments 2a, 2b, and possibly, in addition, further components for signal conditioning (cf. Section B—B).

As can be seen in the plan view, the holes 20 in the stator elements 2a, 2b are situated outside the outer rotor radius R1. Additional linearization of the sensor characteristic curve can be achieved by way of an angle-dependent configuration of the radii.

As is evident from FIG. 10, in this case, too, the magnet 3 is designed as a ring magnet around the shaft 5, which magnet is axially magnetized and is placed directly onto the shaft 5 between the two rotor disks 4a, 4b.

The position sensor according to the invention is illustrated as a linear sensor in FIG. 11.

This linear sensor has two movable, soft-magnetic sliding elements 20a and 20b. The sliding element 20a has a rectangular segment 23, whose magnetically effective area F is dimensioned such that it is exactly matched to the likewise rectangular segment gap 24 in the second sliding element 20b.

A magnet receptacle 22 is mounted on the first sliding element 20a. This magnet receptacle 22 carries a parallelepipedal magnet 3 in such a way that when the magnet receptacle 22 is assembled with the first sliding element 20a, the magnet 3 is arranged outside the effective area F of the first element 20a.

As illustrated in FIG. 12, the magnet receptacle 22 is connected to the magnet 3 and to the two sliding elements 20a and 20b via a rivet connection (openings 25 and rivet 26) and simultaneously serves as a spacer between the two sliding elements 20a and 20b.

The stator elements 21a and 21b, which are fastened on a printed circuit board (not illustrated in any detail), are pushed into the preassembled unit comprising the sliding elements 20a and 20b and also the magnet receptacle 22 in such a way that the air gap 20a between the two stator elements 21a and 21b is partially covered by the active area F of the first sliding element 20a, the stator elements 21a, 21b being arranged spatially near the second sliding element 20b.

If the segment 23 of the first sliding element 20a is symmetrical with respect to the center line M of the sensor, then a compensating flux via the measurement air gap 28 between the stator elements 21a and 21b is not produced. If the sliding elements 20a, 20b are displaced in the y-direction from this position, then a compensating flux via the air gap 28 between the stator elements 21a, 21b is established and recorded by the magnetic field probe 12, which is arranged in the air gap 28 between the two stator elements 21a, 21b.

The linear measurement range of the sensor just corresponds to the active length of the segment 23 of the first sliding element 20a. That means that the sensor is at least three times longer than the measurement range.

The linear sensor described can be used for example to acquire the position of an accelerator pedal in a motor vehicle. For this purpose, the sensor is connected thereto via an accelerator pedal link 19. The link to the restoring spring is effected via the device 30, which is arranged with the aid of the rivets 26 in a simple manner on the sensor, preferably on the second sliding element 20b.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A magnetic position sensor comprising at least two stator elements arranged in a magnetic field, a magnetic field probe located in an air gap between the stator elements, a means that follows the movement of an object being arranged parallel to the plane spanned by the stator elements, wherein the means connected to the movable object comprises two soft-magnetic elements, each soft-magnetic element having at least one segment and the soft-magnetic elements being connected to one another rigidly in a manner displaced relative to one another, with the result that the segment of the first element is located opposite a segment gap in the second element, the stator elements being arranged between the soft-magnetic elements and a magnet that generates the magnetic field perpendicular to the plane spanned by the stator elements being arranged between the soft-magnetic elements.

2. The magnetic position sensor as claimed in claim 1, wherein the means connected to the movable object is a rotor which is arranged in the axial direction with respect to the stator elements, each soft-magnetic rotor element having at least one circle segment, and the rotor elements being connected to one another rigidly in a manner rotated relative to one another, with the result that the circle segment of the first rotor element is located opposite a segment gap in the second rotor element, the stator elements being arranged between the rotor elements and a magnet that generates the magnetic field in the axial direction being arranged both between rotor elements and the stator elements.

3. The magnetic position sensor as claimed in claim 2, wherein there are two air gaps formed in the axial direction between the rotor elements and a respective stator element, the sum of the two air gaps being small compared with the axial extent of the magnet.

4. The magnetic position sensor as claimed in claim 2, wherein the stator elements are of circle segment-like design.

5. The magnetic position sensor as claimed in claims 2 or 4, wherein an outer radius of the circle segment of at least one rotor element approximately corresponds to an outer radius of the circle segment-like stator element.

6. The magnetic position sensor as claimed in claim 5, wherein the rotor elements comprise two radii, the first radius approximately corresponding to the outer radius of a stator element and the second radius approximately corresponding to the radius of the magnet.

7. The magnetic position sensor as claimed in claim 6, wherein the magnetic field probe is arranged radially with respect to a rotary spindle of the sensor in the air gap between two stator elements.

8. The magnetic position sensor as claimed in claims 2 or 4, wherein the outer radius of the circle segment of at least one rotor element is less than the outer radius of a stator element.

9. The magnetic position sensor as claimed in claim 8, wherein the magnetic field probe is arranged axially with respect to a rotary spindle of the sensor in the air gap between two stator elements.

10. The magnetic position sensor as claimed in claim 2, wherein the circle segment of the first rotor element has a smaller angle than the segment gap between two stator segments.

11. The magnetic position sensor as claimed in claims 1 or 2, wherein the magnet that generates the axially directed field is a positionally fixed electromagnet.

12. The magnetic position sensor as claimed in claims 1 or 2, wherein the magnet that generates the axially directed field consists of the combination of a permanent magnet and an electromagnet.

13. The magnetic position sensor as claimed in claims 1 or 2, wherein the magnet is designed as a permanently magnetic ring magnet.

14. The magnetic position sensor as claimed in claim 13, wherein the ring magnet is directly connected to the two stator elements.

15. The magnetic position sensor as claimed in claim 13, wherein the ring magnet is fastened on the rotor shaft.

16. The magnetic position sensor as claimed in claim 2, wherein the rotor elements are rigidly coupled by means of a nonmagnetic sleeve, a respective rotor element being fixedly arranged on a part of the rotor shaft, which is divided into two.

17. The magnetic position sensor as claimed in claim 4, wherein the stator elements are arranged coaxially around the axis of rotation of the rotor shaft.

18. The magnetic position sensor as claimed in any one of claims 1–4, 10, 16, or 17, wherein for the purpose of height equalization between magnet and the magnetic field probe, elevated soft-magnetic regions are arranged on the rotor elements.

* * * * *